United States Patent [19]

Bernhard et al.

[11] 3,926,659

[45] Dec. 16, 1975

[54] IRON-CONTAINING MICA FLAKE PIGMENTS

[75] Inventors: Horst Bernhard; Reiner Esselborn; Reiner Hesse; Horst Russmann, all of Darmstadt, Germany

[73] Assignee: Merck Patent Gesellschaft mit beschraenkter Haftung, Darmstadt, Germany

[22] Filed: Mar. 15, 1974

[21] Appl. No.: 451,387

[30] Foreign Application Priority Data

Mar. 17, 1973 Germany............................ 2313331

[52] U.S. Cl.............. 106/291; 106/304; 106/308 B; 106/300
[51] Int. Cl.² .......................................... C09C 1/00
[58] Field of Search ......... 106/291, 304, 308 B, 300

[56] References Cited
UNITED STATES PATENTS

| | | | |
|---|---|---|---|
| 3,087,828 | 4/1963 | Linton | 106/291 |
| 3,711,308 | 1/1973 | Brand et al. | 106/291 |

FOREIGN PATENTS OR APPLICATIONS

| | | | |
|---|---|---|---|
| 1,959,998 | 7/1971 | Germany | 106/291 |

*Primary Examiner*—Winston A. Douglas
*Assistant Examiner*—J. V. Howard
*Attorney, Agent, or Firm*—Millen, Raptes & White

[57] ABSTRACT

Novel mica flake pigments optionally coated with $TiO_2$, $ZrO_2$ and/or the hydrates thereof, having a uniform iron-containing layer thereon consisting of an iron(III) oxide hydroxide, magnetite and/or the $Fe_2O_3$ modifications obtained therefrom by annealing at a temperature below 1,100° C., are produced by gradually adding an aqueous solution of an iron salt in the presence of an oxidizing agent, to an aqueous suspension of the mica flakes at a constant temperature and a constant pH, thereby forming on the mica flakes a continuous uniform layer consisting solely of a single iron(III) oxide hydroxide modification or of magnetite. The thus-coated flakes are then separated, washed, dried and optionally annealed in a conventional manner at a temperature of up to 1,100° C. to convert the layer to $\alpha$—$Fe_2O_3$ or $\gamma$—$Fe_2O_3$.

31 Claims, No Drawings

IRON-CONTAINING MICA FLAKE PIGMENTS

BACKGROUND OF THE INVENTION

This invention relates to novel mica flake pigments and to a process for their production.

It is known that nacreous pigments are obtained by coating mica flakes with titanium dioxide or zirconium dioxide and/or iron oxides. Such pigments are described, for example, in German Pat. Nos. 1,467,468 and 1,959,998. However, these pigments are not sufficiently lightfast, so that their use is greatly limited in many fields. Furthermore, the hertofore known mica flakes pigments containing iron oxide are also unsatisfactory from the standpoint of possible color variations.

In prior filed application Ser. No. 390,252, filed Aug. 21, 1973, now U.S. Pat. No. 3,874,890 there is described a process in which ferrous hydroxide is precipitated onto mica flakes optionally coated with titanium and/or zirconium oxide or hydroxide. As taught therein, precipitation of iron hydroxide from an aqueous solution of a Fe(II) salt in the presence of an oxidizing agent capable of oxidizing the Fe++ present in the solution does not yield pigments having the improved properties of the pigments produced in that process, which oxidizes the precipitated iron hydroxide after the mica flakes are coated.

We have now found that by the process of this invention, pigments with improved properties can be produced by precipitating the iron hydroxide in a defined structure onto the mica flakes in the presence of an oxidizing agent.

It has now been discovered that surprisingly it is possible to obtain vary lightfast and temperature-stable mica flake pigments, some with heretofore unattainable colors, by a uniform application of iron-containing layers in accordance with the process of this invention. The novel pigments and nacreous pigments which are produced are distinguished by pronounced lightfastness and surprisingly wide range of variations in color nuances. Such pigments have not been produced heretofore, and their properties cannot be explained, either from the known properties of the mica flakes or those of mica flakes coated with titanium dioxide and/or zirconium dioxide, or from the conventional iron oxide and/or ferric hydroxide modifications thereof. These advantages could not be foreseen, since basically, one cannot predict the modification of a compound which will be formed when the compound is deposited on another compound. In most cases, the substrate has a decisive effect on the thus-deposited modification. The behavior of titanium dioxide hydrates on mica, for example, is characteristic of this phenomenon. $TiO_2$ occurs in several modifications. However, the mica substrate promotes the anatase form, even in temperature ranges wherein the conversion into the rutile form has been completed for a long time. Only by weakening the effect of the mica surface during the coating with $TiO_2$ by the concomitant precipitation of, for example, tin dioxide, can the formation of rutile $TiO_2$ be expected. For this reason, it could not be foreseen in iron oxides and/or iron oxide hydroxides on mica systems, which modification would be formed, even when using processes known to produce specific iron oxide or iron oxide hydroxide modifications. Also, it was not possible to predict whether these conventional processes would even result in a suitable coating, and how coatings formed during a successful coating step would appear.

The lightfastness of the novel pigments of this invention is surprisingly high. Even the lightfastness of mica flakes/$TiO_2$ and/or $ZrO_2$ pigments heretofore known as being rather lightfast, can be improved according to this invention.

SUMMARY OF THE INVENTION

In its composition aspect, this invention relates to novel mica flake pigments having an iron-containing layer and optionally coated with $TiO_2$ and/or $ZrO_2$ and/or the hydrates thereof, which iron-containing layer is a uniform layer of one only of $\alpha$—, $\beta$— or $\gamma$—FeOOH, of magnetite or of $\alpha Fe_2O_3$ or $\gamma$—$Fe_2O_3$ formed therefrom after drying or drying and annealing at a temperature below 1,100° C.

In its process aspect, this invention relates to a process for the production of these novel pigments in which an iron-containing layer is precipitated onto mica flakes, which optionally are coated with $TiO_2$ and/or $ZrO_2$ or a hydrate thereof, a cover layer of a colorless metallic oxide is optionally thereafter applied, the thus-coated particles are separated, washed, dried, and optionally annealed and which comprises precipitating the iron-containing layer onto the mica flakes by gradually adding an aqueous solution of an iron salt, in the presence of an oxidizing agent, to an aqueous suspension of the mica flakes at a constant temperature and a constant pH, thereby forming on the mica flakes a continuous uniform layer consisting solely of a single iron (III) oxide hydroxide modification or of magnetite of a defined structure.

In its process aspect, this invention relates further to a process for the production of these novel pigments in which an iron-containing layer is precipitated onto mica flakes, which optionally are coated with $TiO_2$ and/or $ZrO_2$ or a hydrate thereof, a cover layer of a colorless metallic oxide is optionally thereafter applied, the thus-coated particles are separated, washed, dried, an optionally annealed and which comprises precipitating the iron-containing layer onto the mica flakes by gradually adding an aqueous solution of an iron(III) salt, to an aqueous suspension of the mica flakes containing urea or acetamide at a constant temperature and a constant pH, thereby forming on the mica flakes a continuous uniform layer consisting of $\beta$—FeOOH.

The feeding rate is regulated, in order to attain optimum results, so that approximately 0.01 to $25 \cdot 10^{-5}$ mole of $Fe^{++}$ ions is fed per minute per m² of mica surface to be coated.

DETAILED DISCUSSION

The ferric oxide hydroxide modifications are $\alpha$-, $\beta$- and $\gamma$-FeOOH. The ferric oxide modifications produced therefrom are $\alpha$- and $\gamma$-$Fe_2O_3$. The preferred defined modifications for the coated mica flakes of this invention are $\alpha$- and $\gamma$-FeOOH, magnetite ($Fe_3O_4$) and the $\alpha$- and $\gamma$-$Fe_2O_3$ produced therefrom by annealing.

The pigments of this invention are novel. Although in known pigments a layer of $\alpha$-$Fe_2O_3$ is also formed on mica flakes after annealing, such pigments surprisingly exhibit significant differences compared to the novel pigments, for example with respect to lightfastness, nacreous luster, interference color formation and color nuancing. Therefore, the feature responsible for the properties of such pigments is not solely the chemical composition of the coating. Instead, a surprising number of other factors play a part herein, especially the structure and character of the final layer, which are dependent on the properties of the originally precipitated layer. Apparently, an essential aspect is that the original precipitation step must yield a unitary layer of a specific modification with a defined crystalline configuration and a definite structure. This layer is retained in the annealed pigment, i.e., during the conversion of the precipitated layers into $\alpha\text{-}Fe_2O_3$ or $\gamma\text{-}Fe_2O_3$ and determines, in dependence on the manner in which it has been produced, the various properties and forms of appearance of the final pigment.

It was not known heretofore that $\alpha\text{-}FeOOH$, $\beta\text{-}FeOOH$, $\gamma\text{-}FeOOH$ as well as $Fe_3O_4$ could be deposited on mica. Consequently, no predictions could be made of the pigment properties of the coated products and the character of the pigments formed by converting the $\alpha\text{-}FeOOH$, $\beta\text{-}FeOOH$, $\gamma\text{-}FeOOH$ or $Fe_3O_4$ layers into an $Fe_2O_3$ layer. It has been found surprisingly that mica flakes, optionally coated with $TiO_2$ and/or $ZrO_2$, having deposited thereon in accordance with this invention $\alpha\text{-}FeOOH$ or $\alpha\text{-}Fe_2O_3$ produced therefrom exhibit interference colors.

No process has heretofore been known for precipitating large percentages of iron-containing layers on mica. It is expressly set forth, for example, in German Pat. No. 1,467,468 that an iron oxide content of more than 30% is obtainable only with difficulties, while a content of more than 40% is practically unattainable. However, an iron oxide content of less than 30% is insufficient for obtaining the layer thicknesses required for vigorous interference colors and nacreous luster. It is now possible according to this invention, by the precipitation of layers of, for example $\alpha\text{-}FeOOH$ of radiographic purity, to produce pigments having layers of iron oxide and/or ferric hydroxide of thicknesses sufficient to provide a content of up to 90% by weight of iron oxide and/or ferric hydroxide. Thus, it is now possible for the first time to obtain satisfactory nacreous pigments consisting only of mica and iron oxide and/or a ferric hydroxide.

The novel pigments of this invention can be produced from all mica flake based pigments. Thus, the starting material for the process are both uncoated mica flakes and mica flakes coated with a uniform layer of a metallic oxide. Such pigments are commercially available and disclosed, for example, in German Pat. No. 2,009,566. Normally, mica flakes are used having diameters of about 5 – 200 microns and a thickness of between 0.1 and 5 microns, preferably about 0.5 micron. As the metallic oxide coatings, titanium dioxide or titanium dioxide hydrates and/or zirconium dioxide or zirconium dioxide hydrates are primarily utilized because of their advantageous index of refraction. A pigment used especially frequently is, for example, a mica flake pigment whose mica flakes have an average diameter of about 5–50 microns and a thickness of about 0.5 micron and are uniformly coated with an optionally hydrated titanium dioxide layer, wherein the mica surface contains about 5–300 mg. of $TiO_2$ per square meter. These conventional nacreous pigments exhibit various colors, depending on the layer thickness of the precipitated $TiO_2$ and/or $ZrO_2$ layer and therefore are available in various types. Normally, calcined products are involved, but also the unannealed pigments can be used. It is also possible to use all other coated mica flake pigments, particularly also those having different layer thicknesses of $TiO_2$ and/or $ZrO_2$. The titanium dioxide layers of such pigments can be substantially less than usual, particularly as compared to the commercial products. Furthermore, if specific effects are to be achieved, it is also possible to use as the starting material for the coating all nacreous pigments containing, in the layers present on the mica flakes, as additional additives, coloring metallic oxides, e.g., oxides of iron, nickel, cobalt, chromium or vanadium. Optionally, these layers can also contain metallic oxides which do not have a coloring effect, e.g., aluminum oxide and antimony oxide. These pigments are likewise known and are described, for example, in German Pat. Nos. 1,467,468 and 1,959,998.

In the process of this invention, these starting materials are coated so that the thus-formed precipitate is deposited immediately and quantitatively. For this purpose, it is essential that an excess of metallic ions in the suspension be avoided. Thus, per unit time, only such an amount of soluble metallic ions is to be fed to the reaction only as rapidly as they can be absorbed by the surface to be coated as a low-solubility iron compound. Only be preventing insoluble particles which are not bound onto the pigment surface from being precipitated in the suspension, are homogeneous layers having identical and uniform layer thickness formed on the mica flakes, which is absolutely necessary for pigments to be formed having a high brilliance and a satisfactory nacreous luster. A more detailed description for conducting the precipitation to obtain such layers is found, for example, in German Pat. No. 2,009,566, as well as in Application Ser. No. 390,252 and German Pat. Application No. P 22 44 298.

According to this invention, the starting material is coated with a oxide hydroxide or ferric oxide so that unitary, smooth layers are produced having a quite specific modification and/or defined crystalline shape. The detection and monitoring of this effect takes place by radiography. Most suitable as ferric hydroxides and oxides are $\alpha\text{-}$, $\beta\text{-}$ and $\gamma\text{-}FeOOH$, as well as magnetite ($Fe_3O_4$).

Especially advantageous is $\alpha\text{-}FeOOH$, which can be applied to mica flakes as well as mica flakes coated with $TiO_2$ and/or $ZrO_2$ in smooth layers with interference colors. The resulting pigments are distinguished by extraordinary lightfastness. With a small layer thickness of $\alpha\text{-}FeOOH$, fawn brown powders are obtained which, in incident light, show a silver hue superimposed by the inherent color of the pigment. With increasing layer thickness, reddish brown powders are produced, and the interference colors span the known spectrum of yellow via red, blue, green, in the direction of colors of a higher order.

If the pigments are annealed, during annealing at between 400° and 1,100° C., the $\alpha$-ferric hydroxide is converted into $\alpha\text{-}Fe_2O_3$ which likewise forms smooth layers with interference colors and is also lightfast and temperature-stable.

The annealed products are $\alpha\text{-}Fe_2O_3$ coated mica flake pigments of various colors. With a $Fe_2O_3$ content of up to about 25%, they are orange-brown and show a silver hue in incident light, superimposed by the inherent color of the pigment. With a greater layer thickness, violet-red powders are obtained, and the interference colors traverse the known spectrum.

$\gamma\text{-}FeOOH$ also imparts very interesting properties to the mica flakes. In a thin layer, this material forms, on mica, moderately smooth layers of a deep orange color and without interference colors. During dehydration at temperatures of up to about 350° C., this ferric hydroxide is transformed into $\gamma\text{-}Fe_2O_3$, showing dark brown layers and likewise neither interference nor nacreous luster. However, if the annealing is conducted at temperatures of between about 400° and 1,100° C., preferably 600°–1,000° C., this ferric hydroxide also changes over into $\alpha$-$Fe_2O_3$, although in this case the compound imparts orange layers.

Also suitable is $\beta$-FeOOH, which imparts a brilliant, orange-yellow color hue to uncoated mica flakes. During annealing, this compound is converted into $\gamma$-$Fe_2O_3$ or $\alpha$-$Fe_2O_3$ or a mixture thereof, having golden yellow coloring.

Good results can also be attained with a coating of magnetite ($Fe_3O_4$), which form black layers without nacreous luster and which are rough due to the crystalline configuration of $Fe_3O_4$. These layers are stable up to about 200° C. During heating in the air to temperatures of between 300° and 1,100° C., preferably 600°–1,000° C., $\alpha$-$Fe_2O_3$ is also formed from the magnetite. In this case, there is obtained in a reddish brown layer which, in accordance with the base layer of magnetite, also does not exhivit a smooth surface. This layer is temperature-stable, but does not show any interference colors and thus no nacreous luster.

When using, in place of mica, a mica pigment coated with $TiO_2$ and/or $ZrO_2$ which already shows interference colors in incident light, when coating with $\alpha$-FeOOH with an increasing layer thickness, a further shift of the interference colors in the direction toward colors of a higher order is observed. With thin layers of $\alpha$-FeOOH, the resulting powders are beige to flesh-colored. With increasing layer thickness, they assume a brown coloring. If such pigments are annealed at temperatures of above 400° C. (up to about 1,100° C.), the $\alpha$-FeOOH layer is converted into an $\alpha$-$Fe_2O_3$ layer. The thus-produced pigments likewise show vigorous interference colors in incident light. However, the color hues are shifted to a minor extent as compared to the starting materials. The shift depends on the annealing conditions (time and temperature), as well as on the substrate. If the layer thickness of the substrate is preserved during annealing, the colors shift in the direction of a higher order. If the substrate can shrink during annealing, or if its index of refraction is changed during annealing, a shift of the interference colors in the reverse direction can also take place. Both effects can also compensate each other. The annealed pigments show various nuances of a warm reddish brown in the color of the powder.

If the mica flake pigment made with $TiO_2$ and/or $ZrO_2$ is coated with $\gamma$-FeOOH, the interference color is shifted in this case, also. For example, starting with a bluereflecting mica/$TiO_2$ pigment, a golden olive hue is produced. With a smaller layer thickness of $\gamma$-FeOOH, the pigments are beige to flesh-colored and with increasing layer thickness, they assume a chocolate-brown color.

If such pigments are annealed at temperatures of between 400° and 1,100° C., the $\gamma$-FeOOH layer is converted into an $\alpha$-$Fe_2O_3$ layer. The thus-produced pigments also exhibit vigorous interference colors in incident light with the color hues being somewhat shifted with respect to the starting materials. Thus, for example, a previously olive-green pigment shows, after annealing, a pronounced golden-yellow luster. The annealed powders have a flesh color with thin layer thicknesses and at larger layer thicknesses, they are reddish brown.

If the pigments coated with $\gamma$-FeOOH are dehydrated by heating at temperatures of below 350° C., the $\gamma$-FeOOH layer is converted into a $\gamma$-$Fe_2O_3$ layer. The resultant pigments show strong interference colors in incident light with the color hues being hardly shifted with respect to the starting material but being in part more intense.

If mica flake pigments made with $TiO_2$ and/or $ZrO_2$ are coated with magnetite, the interference color of the starting material is reinforced in the case of thin layer thickness and the originally silver white powder itself assumes the interference color. With increasing layer thickness, the pigments assume a black color and lose their luster but for the most part the interference color hue is retained.

The $\alpha$-$Fe_2O_3$ and $\gamma$-$Fe_2O_3$ layers obtainable from the various primary modifications by annealing exhibit differing colors because the configuration of the particles precipitated on the substrate formed during this precipitation remains essentially preserved also during the annealing step. This configuration determines, besides the modification, the color of the final product. There results a plurality of variation possibilities of the attainable color hues.

The basic conditions for the precipitation of the various ferric hydroxide and/or iron oxide modifications are described in the literature. Thus, detailed data for conducting the reactions are contained, for example, in "Journal fuer praktische Chemie," 4th series, Vol. 13, pp. 163–176 (1961), as well as in "Farbe und Lack," Vol. 69, pp. 814–819 (1963), whose disclosures are expressly incorporated by reference herein. It is known that several interconnected factors govern the formation of the individual compounds and modifications. Among these are primarily the reaction medium, the pH thereof, the temperature, and, in many cases, also the extent of the oxygen supply. In general, however, the formation of $\alpha$-FeOOH from Fe(II) salt solutions is promoted by higher temperatures and lower pH values, whereas the formation of $\gamma$-FeOOH is promoted by lower temperatures and higher pH values. The formation of magnetite from iron(II) salt solutions, particularly $FeSO_4$ solutions, is attained by a higher temperature and a relatively high pH.

In the presence of air as the oxidizing agent, a temperature range of 25°–100° C., preferably 50°–80° C. and a pH range of 4–8, preferably 5,5 – 7.0 has proved to be favorable for the formation of $\alpha$-FeOOH. In contrast thereto, for the precipitation of $\gamma$-FeOOH, the process is suitably accomplished at temperatures between 0° and 50° C., preferably between 15° and 40° C., and at pH values of between 5 and 11, preferably between 6 and 9. For the formation of magnetite, temperature ranges of from 0° to 100° C., preferably 50°–100° C. and pH values above 7, preferably between about 8 and 11, are employed. $\beta$-FeOOH is most advantageously precipitated from Fe(III) salt solutions at temperatures of above 75° C., using urea or acetamide as the precipitant. Advantageously, an equivalent excess of urea, based on the ferrous salt, of about 100–400% is employed.

The optimum reaction conditions for the formation of a uniform layer of specific modification can readily be determined by routine experimentation. They vary somewhat, as mentioned above, and frequently also additionally in dependence on other reaction conditions, such as concentration of the added solutions, feeding rate, agitating speed, and type of oxidizing agent employed. Thus, in each case, the selected reaction conditions must be adapted to one another.

In the precipitation of ferric hydroxides, air is advantageously used as the oxidizing agent. When precipitating magnetite, the process is in most cases advantageously carried out not using air as oxidizing agent, in order to exclude the progressive oxidation of $Fe_3O_4$ to $Fe_2O_3$. Instead, $Fe_3O_4$ is formed quantitatively as the magnetite from iron(II) salt solutions in the absence of air and in the presence of chemical oxidizing agent, preferably a nitrate, e.g., ammonium, sodium or potassium nitrate, or a chlorate. The oxidation is limited under these conditions to this oxidation stage, if the pH is above 7. The oxidizing agent is added, if possible, in stoichiometric amounts, with 1 mole of oxidizing agent being required for 12 moles of iron(II) ions when using a nitrate. However, the literature also contains descriptions to the effect that even with an excess of oxidizing agent, especially in case of nitrates, no further oxidation takes place. Therefore, the reaction conditions can be varied within wide limits. In each case, the only important factor is that a single desired modification is uniformly precipitated.

Except when precipitating $\beta$-FeOOH, it is also essential to conduct the coating of the starting material by precipitating the coating from a solution of an iron(II) salt. With iron(III) ions, $Fe(OH)_3$ gels are normally obtained, resulting in agglomerations and secondary hydrolysis. For this reason, only when precipitating $\beta$-FeOOH, is the process usually conducted with $FeCl_3$ solutions or other solutions of iron(III) salts.

The precipitation of the iron-containing layer in accordance with the invention normally is conducted while the starting material, i.e., the optionally coated mica flakes, is suspended in water. The pH of this suspension is adjusted to the pH desired for the precipitation step by adding a mineral acid, e.g., $H_2SO_4$, or a base, e.g., $NH_3$ or NaOH. An aqueous solution of an iron salt is added in metered quantities to this suspension under constant agitation at the desired temperature, which is preferably maintained constant in each case during the entire coating process. The precipitation is accomplished under conditions which make it possible to form a uniform and coherent layer. This is done with particularly good results, for example, starting with a solution of an iron(II) salt, especially iron(II) sulfate. Also suitable are ammonium iron(II) sulfates and iron(II) halides. The concentration of the iron salt solutions is normally between about 5 and 500 g/l., preferably about 10–300 g/l. The pH is maintained as constant as possible during the precipitation step. For this reason, the desired pH is to be adjusted, if necessary, during the reaction by adding alkali or acid. In some instances, it is also advantageous to effect the precipitation in the presence of buffer salts. Such buffer systems are, for example, borate, acetate, ammonia-ammonium chloride and/or glycocoll buffers of conventional composition. They can either be provided in the pigment suspension or fed thereto with the precipitating solution.

By varying the coating speeds and the concentrations, it is also possible, in part, to change the grain of the coating, especially when precipitating the magnetite, which can also have an effect on the color.

During the precipitation of $\alpha$- and $\gamma$-FeOOH, a vigorous stream of air is simultaneously introduced, in order to obtain the oxidation to the desired oxidation stage. In case of coating with magnetite, however, the process is advantageously carried out under an atmosphere of nitrogen or another inert gas, so that the desired oxidation state is not exceeded but rather is attained in a controlled procedure by employing a chemical oxidizing agent added in stoichiometric amounts.

It is advantageous to add, before coating the starting material, a wetting agent, preferably nonionic. Suitable are, for example, polyalkylene glycol, polyoxyethylene fatty alcohol ether, polyoxyethylene fatty acid ester, alkylphenol polyglycol ether and hydroxyalkyl cellulose, e.g., hydroxypropylcellulose, based wetting agents. The wetting agents are normally added in amounts of between 0.01 and 10% by weight, based on the starting mica flake suspension. The pigments obtained using such wetting agents are distinguished by an especially high luster and an increased chroma.

In some cases it is advantageous to provide additionally a cover layer on the thus-produced novel pigments. Suitably, a layer of colorless metal oxide, is employed for this purpose in a conventional manner, e.g., titanium dioxide, zirconium dioxide, aluminum oxide, antimony oxide, zinc oxide, or tin oxide. Such a cover layer can be applied in accordance with the customary methods either on the dried or calcined pigments, or, still more simply, prior to separating the pigments from the precipitation solution. Generally, the cover layer is thinner than the coating applied according to this invention. In particular, a $TiO_2$ layer should not be thicker than about 15 nm., so as not to impair the lightfastness of the novel pigments. A layer of aluminum hydroxide or $Al_2O_3$ in most cases provides additional stabilization, namely with respect to mechanical properties as well as lightfastness. The layer thickness is not particularly critical in this case, since aluminum hydroxides and oxides have a relatively low index of refraction. The methods for the application of such layers are conventional and disclosed, for example, in German DOS 1,467,468. In most cases, a customary calcination is advantageously conducted after the application of the cover layer.

The coated mica flakes are normally separated from the reaction mixture, washed well with water and dried. If desired, an annealing step can follow at temperatures of up to about 1,100° C., e.g., for about 10 minutes to about 4 hours. Preferably, the annealing temperatures range about between 600° and 1,000° C.

The iron-containing layers can have thicknesses of up to about 500 nm., preferably 0.1 nm. to 250 nm., depending on the color desired. The coating step in each case is interrupted when the desired color hue has been achieved. If nacreous pigments are utilized as the starting material and iron-containing layers are precipitated thereon which do not produce interference colors, the nacreous luster, of course, gradually decreases with an increasing layer thickness, which represents a further variation possiblity. The layer thicknesses are in most cases altered to only a minor extent in the annealing step.

The novel pigments can contain up to about 90% by weight of ferric hydroxides and/or iron oxides. For most fields of application, contents of up to about 65% are preferred. By the process of this invention, it is now possible for the first time to produce layered pigments with smooth, uniform and adhering layers with such a high iron content. This is the more astonishing as, according to the methods known heretofore, a deposition of more than 30 or 40% by weight of iron oxides has met with insurmountable difficulties in practice. However, the coating with the iron oxides and ferric hydroxides according to the present invention has now made it possible also to manufacture pigments having extremely high iron contents.

The novel pigments represent a significant advance in the art field. For the first time, an entire palette of iron-containing pigments has been made available, distinguished by lightfastness and light stability and by a wide variety of colors and color nuances. Also, from the viewpoint of practical application technology, being able to control the properties by the type and configuration of the substrate is of great advantage.

Using mica flakes coated with $TiO_2$ and/or $ZrO_2$ as the starting material, nacreous pigments are produced having a heretofore unsurpassed nuancing with simultaneous light stability. When providing uncoated mica flakes with the layer, pigments are obtained having a pronounced transparent character. At the same time, the present invention offers the possibility of producing a specific color of iron pigments in a specific particle size. Whereas with conventional iron oxide pigments the color of the pigment is linked with a certain crystal size, it is possible in the pigments of this invention to vary the form of the particles extensively independently of the color because of the variation possibilities which exist with the substrate, viz., the mica flakes.

The $\alpha$-FeOOH coated pigments of this invention show excellent interference colors in both the annealed and unannealed condition with layer thicknesses of >50 nm. They are superior nacreous pigments with, in part, a metallic character and are extremely lightfast. Therefore, they can be utilized advantageously, but not exclusively, in synthetic resins, varnishes, particularly automobile enamels, furthermore in the cosmetic field, and as a substitute for bronze. Pigments of this invention having layers of $\alpha$-FeOOH on $TiO_2$-coated mica flakes represent, in the annealed and unannealed condition, nacreous pigments having a yellow to reddish brown powder color and an excellent luster. They are more lightfast than the conventional mica/$TiO_2$ pigment. They are suitable predominantly for use in synthetic resins, varnishes and in the cosmetic field.

The $\gamma$-FeOOH coated pigments of this invention are transparent in the annealed and unannealed condition, without nacreous luster, with orange to deep brown color hues. They can be used in all fields where iron oxide pigments have been used in the desired color.

The $\gamma$-FeOOH on $TiO_2$-coated mica flake pigments of this invention are, in the annealed and unannealed condition, nacreous pigments having various interference colors and possessing a beige to dark brown powder color. They are useful predominantly in the synthetic resin industry and in the cosmetic field.

The unannealed magnetite coated pigments of this invention have a black color and can be used, due to its particle size, in a greater variety of ways than the heretofore known black iron pigments. In its annealed condition, this pigment is a dark brown and/or reddish brown transparent powder. It can be employed in all fields wherein the iron oxide pigments with these colors have heretofore been utilized. The pigments carrying magnetite on mica flakes coated with $TiO_2$ and/or $ZrO_2$ are, in the unannealed condition, nacreous pigments having very strong interference colors, and are grey to black in color scintillating in the interference color hue. After annealing, this pigment yields nacreous pigments having a beige to brick red color. Uses for this pigment are in synthetic resins, in varnishes and in the cosmetic field. The interference colors of the nacreous pigment used as the starting material are enhanced by the precipitated black layer of $Fe_3O_4$, so that an even more brilliant play of colors is produced, especially with relatively thin layers of magnetite. By the precipitation of the magnetite on the substrate structure predetermined by the mica flakes, an orientation of the magnetite crystals is further attained during precipitation. In this way, magnetic pigments are thus produced having a wide variety of possible uses with respect to the orientation in a magnetic field. Such pigments can be employed, for example embedded in synthetic resins, e.g., as household magnets or as storage magnets, e.g., sound tapes.

The pigments of this invention made from uncoated mica flakes are also excellent rust-proofing agents. Rust-proofing agents on the basis of iron oxides possess special effectiveness if they contain platelet-shaped particles, since in this case the diffusion path for the atmospheric oxygen to the surface of the substrate to the protected is the longest. This is a further important advantage of the iron oxide pigments of this invention.

The pigments of this invention can be employed in the same way as heretofore known pigments. They are particularly suitable where lightfastness is required (e.g., automobile enamels) an in the cosmetic field, where definite and very differentiated color nuances are desirable. The concentrations of pigments employed in appropriate preparations range between 0.1 and 80%, depending on the intended field of application.

In the cosmetic field, nacreous pigments are normally employed at concentrations of between about 0.1 and 80 %. Forms of preparation are, for example, powders, ointments, emulsions and oily sticks, e.g., eye shadow pencils (pigment content about 5–15%), eye shadow powder compacts (pigment content about 20–70%), liquid preparations for eye shadow and eyeliner (pigment content about 7–15%), lipsticks (pigment content about 10–20%), lip gloss for brushing on (pigment content about 10–15%), makeup in stick form (pigment content about 15–25%), makeup powder compacts (pigment content about 10–50%), makeup emulsions (pigment content about 5–10%), makeup moisturizing gel (pigment content about 1–5%), light protective emulsions and tanning emulsions (pigment content about 5–10%), bubble bath concentrates with color luster (pigment content about 0.1 – 2%), skin care lotions (pigment content about 0.1 – 2%). The advantage of the pigments of this invention when used in the cosmetic field resides in that a superior color luster is generated as desired for many decorative cosmetics. Furthermore, the pigments of this invention are distinguished by their simple use in the form of masterbatches, because the color and luster components, which normally requires the use of separate color pigments and lustrous pigments, are combined in one substance. Since the coloring components are naturally present in a very fine distribution, due to the manner in which they were produced, the otherwise usual detour route of mechanical premixing step is eliminated. Furthermore, it is easily possible with the pigments of this invention to obtain iridescent color effects in the products resulting from such incorporation. Finally, the simple and suitable combination of the novel pigments with the usual synthetic nacreous pigments, e.g., mica/titanium dioxide, bismuth oxychloride, and guanine, is an important use. By simply mixing and blending the pulverulent novel pigments with the conventional nacreous powders, color and luster can be varied in any desired manner adapted to the fashion requirements. As stated above, the pigments of this invention are an important contribution to the art field, due to the beige or brown skin tones with a great variety of interference colors which are producible for the very first time with the use of nacreous pigments. Heretofore, the obtainable spectrum of brown tones was extremely limited.

Without further elaboration, it is believed that one skilled in the art can, using the preceding description, utilize the present invention to its fullest extent. The following preferred specific embodiments are, thereb. The pigments prepared according to Example 1(a) are annealed for 30 minutes at 900°. The $\alpha$-FeOOH changes over into $\alpha$-Fe$_2$O$_3$ during this step, and the color is changed to a minor extent. Besides, the interference color observable in the angle of reflection is also somewhat altered, namely in the direction toward an interference color of a higher order. The thus-obtained pigment is likewise distinguished by an excellent lightfastness and chemical stability.

Table I represents the relationships of the amounts of ferric oxide hydroxide and iron oxide, respectively, the color of the powder, and the interference color for the unannealed and annealed pigments.

TABLE I

| Period of Addition hours | FeSO$_4$ Solution* Consumed, in l. | Pigment Dried | | | Pigment Annealed | | |
|---|---|---|---|---|---|---|---|
| | | $\alpha$-FeOOH % | Interference Color | Color of Powder | $\alpha$-Fe$_2$O$_3$ % | Interference Color | Color of Powder |
| 2.5 | 25 | 13.7 | silver | orange | 12.6 | silver | orange |
| 10 | 100 | 38.9 | reddish gold | brown | 36.5 | reddish gold | brown |
| 17.5 | 175 | 52.7 | orange red | red | 50.2 | red | violet red |
| 22.5 | 225 | 58.9 | red violet | red violet | 56.4 | violet | red violet |
| 25 | 250 | 61.4 | | brown violet red | 59.1 | green | brown violet red |

*300 g. FeSO$_4$ . 7H$_2$O/l.

fore, to be construed as merely illustrative and not limitative of the remainder of the disclosure in any way whatsoever.

The temperatures set forth in the following examples are in degrees Celsius.

EXAMPLE 1 a. 15 kg. of muscovite having a diameter of about 10–40 $\mu$ and a thickness of about 0.5 $\mu$ (specific surface area approximately 3.5 m$^2$/g., determined from the adsorbable amount of nitrogen) is suspended in 600 l. of fully desalted water. The suspension is heated under agitation to 75°, and a pH of 6.0 is set by adding H$_2$SO$_4$ or NH$_3$. Thereafter, a solution of 90 kg. of FeSO$_4$ · 7 H$_2$O and 900 ml. of concentrated sulfuric acid in 300 l. of water is gradually added thereto in metered quantities. Simultaneously, air is introduced under agitation. The pH is maintained constant at pH 6.0 by adding NH$_3$. The thus-precipitated $\alpha$-FeOOH is deposited on the mica flakes in the form of a smooth coating. The thus-obtained product first shows the yellow color of the precipitated ferric oxide hydroxide, but attains a strong nacreous luster with increasing ferric oxide hydroxide content. The color of the powder and the color of the light reflected in the angle of reflection depend on the layer thickness of the ferric oxide hydroxide coating. The color of the light reflected in the angle of reflection traverses the characteristic series of interference colors, modified by the inherent color of the precipitated ferric oxide hydroxide. The powder color of the pigment passes through various nuances from a reddish yellow to a dark reddish brown.

The coating step can be interrupted at any desired quantity of ferric oxide hydroxide. The pigment is then allowed to settle, filtered off, washed salt-free with water, and dried at about 130°. The thus-produced pigment possesses an excellent lightfastness.

EXAMPLE 2 a. 15 kg of muscovite having a particle diameter of 10–40 $\mu$ and an average thickness of about 0.5 $\mu$ (specific surface area about 3.5 m$^2$/g.) is suspended in 600 l. of water. After setting a pH of 7.5 by adding H$_2$SO$_4$ or NH$_3$, 125 l. of a solution of 90 kg. of FeSO$_4$ ·7 H$_2$ O and 900 ml. of concentrated sulfuric acid in 300 l. of water is gradually added thereto in metered quantities at room temperature (about 20°); simultaneously, air is introduced into the reaction mixture. By feeding NH$_3$ the pH value is kept constant at 7.5. The thus-precipitated $\gamma$-FeOOH is quantitatively deposited on the mica particles and results in the formation of an orange-colored pigment without nacreous luster. The color of the pigment powder becomes stronger with increasing amounts of ferric oxide hydroxide added thereto, without there being a significant change in the color hue. The final product contains 44.2% of $\gamma$-FeOOH and has a deep orange color.

b. The pigment obtained according to Example 2a is annealed for 30 minutes at about 300°, thus obtaining a coffee-brown pigment without nacreous luster, containing 41.7% by weight of $\gamma$-Fe$_2$O$_3$.

c. The pigment obtained according to Example 2a or 2b is annealed for 1 hour at 950°, thus producing a pigment having an orange-red color without nacreous luster, containing 41.7% by weight of $\alpha$-Fe$_2$O$_3$.

EXAMPLE 3 a. 15 kg. of muscovite according to Example 2a is suspended in 600 l. of fully desalted water. The suspension is heated under agitation to 75° and brought to pH 9.5 by adding NaOH (10%). Then, 7.5 kg. of KNO$_3$ is added thereto and thereafter, 125 l. of a solution of 90 kg. of FeSO$_4$ · 7 H$_2$O and 900 ml. of sulfuric acid (concentrated) in 300 l. of water is gradually added while simultaneously introducing nitrogen. The pH is maintained at 9.5 by adding 10% NaOH in metered amounts.

The thus-precipitated magnetite ($Fe_3O_4$) is quantitatively deposited on the mica in the form of small crystals and gradually colors the mica black. The reaction temperature of 75° is maintained during the entire precipitation step. The pigment is allowed to settle and is then filtered off, washed with water, and dried at temperatures of below 250°, e.g. 130°.

b. The black pigment obtained in accordance with Example 3a is converted, by annealing at 950° for 1 hour, into a reddish brown product having a transparent character, but not exhibiting a nacreous effect. This pigment contains 41.7% of $\alpha$-$Fe_2O_3$ on mica.

EXAMPLE 4 a. Analogously to Example 1, 20.8 kg. of $TiO_2$-coated mica flakes (consisting of 72% muscovite having a particle size of 10–40 $\mu$ and 28% $TiO_2$, silvery nacreous luster) are coated with $\alpha$-FeOOH. Also in this case, the precipitated ferric oxide hydroxide is deposited in a smooth layer on the pigment particles. During this process, the known interference colors are passed through in rapid succession; the powder color of the preparations likewise depends on the precipitated amounts of $\alpha$-FeOOH.

The coating step can be terminated at any desired amount of ferric oxide hydroxide and accordingly at any desired interference color. The pigment is allowed to settle, filtered, washed with water so that it is free of salt, and dried for 2 hours at about 130°.

b. The pigment obtained according to Example 4a is annealed for 1 hour at 950°. The color is altered during this step, and the $\alpha$-FeOOH layer passes over into the corresponding $\alpha$-$Fe_2O_3$ layer.

Table II indicates the correlation among the ferric oxide hydroxide content, the iron oxide content, the interference color, and the color of the powder.

TABLE II

| Period of Addition hours | $FeSO_4$ Solution Consumed, in l. | Pigment Dried | | | Pigment Annealed | | |
|---|---|---|---|---|---|---|---|
| | | $\alpha$-FeOOH % | Interference Color | Color of Powder | $\alpha$-$Fe_2O_3$ % | Interference Color | Color of Powder |
| 2.5 | 25 | 10.9 | silver to yellow | beige-brown | 9.35 | silver to yellow | beige-brown |
| 5 | 50 | 18.6 | golden yellow | light brown | 17.25 | reddish gold | orange-brown |
| 7.5 | 75 | 25.6 | reddish gold | medium brown | 23.6 | deep red-gold | medium reddish brown |
| 12.5 | 125 | 36.4 | copper red | reddish brown | 34.1 | copper red | violet red |

EXAMPLE 5 a. Analogously to Example 2, 30 kg. of $TiO_2$-coated mica flakes (consisting of 50% muscovite having a particle size of 10–40 $\mu$ and 50% $TiO_2$, blue nacreous luster) is coated with $\gamma$-FeOOH. Also in this case, the precipitated ferric oxide hydroxide is deposited quantitatively on the pigment particles. At first, the interference color of the naacreous pigment is shifted somewhat. A larger amount of $\gamma$-FeOOH then results in a marked reduction of the nacreous luster and finally in a deepening of the orange-brown color hue connected with $\gamma$-FeOOH. The coating step can be interrupted at any desired quantity of $\gamma$-FeOOH, and the pigment can be worked up as described above.

Table III compiles the values showing the correlation among precipitated amount of $\gamma$-FeOOH, interference color, and powder color.

TABLE III

| Period of Addition hours | $FeSO_4$ Solution Consumed, in Liters | $\alpha$-FeOOH % | Interference Color | Powder Color |
|---|---|---|---|---|
| 2.5 | 25 | 7.36 | sky blue | pink beige |
| 5 | 50 | 13.7 | blue-green | medium brown (earth colored) |
| 7.5 | 75 | 19.3 | brownish green | medium brown (earth colored) |
| 10 | 100 | 24.2 | olive green | brown |
| 12.5 | 125 | 28.5 | deep olive green | chocolate brown | b. The brown pigment obtained according to Example 5a, having a $\gamma$-FeOOH content of 28.5%, is heated for ½ hour to 300°. A product is obtained having a coffee-brown powder color and a content of 26.5% of the $\gamma$-$Fe_2O_3$ associated therewith.

c. The pigments obtained according to Examples 5a and 5b are annealed for ½ hour at 900°. The following Table IV shows the correlation between the interference color and the color of the powder:

TABLE IV

| Period of Addition hours | FeSO₄ Solution Consumed, in Liters | α-Fe₂O₃ % | Interference Color | Powder Color |
|---|---|---|---|---|
| 2.5 | 25 | 6.7 | sky blue | flesh colored |
| 5 | 50 | 13.0 | green | orange brown |
| 7.5 | 75 | 17.8 | green-yellow | orange brown |
| 10 | 100 | 22.4 | green-gold | deep orange brown |
| 12.5 | 125 | 26.5 | red gold | deep orange brown |

EXAMPLE 6 a. Analogously to Example 4, 27.3 kg. of TiO₂-coated mica flakes (consisting of 55% muscovite of a particle size of 10–40 μ and 45% TiO₂, red interference color) is coated with α-FeOOH. The pH is set to 6.2, the reaction temperature is 70°. The pigment is worked up as described above.

b. The pigments produced in accordance with Example 6a are annealed for 45 minutes at 900°. The α-FeOOH layer passes over into the associated α-Fe₂O₃ layer, and the interference colors and the powder colors are altered. Table V compiles the relationship among the amounts of precipitated α-FeOOH, of α-Fe₂O₃, the powder color, and the interference color:

vite having a particle size of 10–40 μ, 26% TiO₂ and 2% ZrO₂, silver nacreous luster) is coated with Fe₃O₄. Also in this case, the precipitated magnetite is quantitatively deposited on the pigment particles. The interference color of the nacreous pigment does not change, but the pigment obtains a metallic character. When the coating step is conducted with larger amounts of magnetite, the pigment becomes black and loses its lustrous properties entirely. The coating can be interrupted at any desired quantity of iron oxide. The pigment is worked up as described above and dried at about 100° for 2 hours.

b. The pigments produced according to Example 7a are annealed at 900°. During this step, the Fe₃O₄ layer passes over into the associated α-Fe₂O₃ layer, and the color of the powdered pigment is changed. Table VI

TABLE V

| Period of Addition hours | FeSO₄ Solution Consumed, in l. | Pigment Dried | | | Pigment Annealed | | |
|---|---|---|---|---|---|---|---|
| | | α-FeOOH % | Interference Color | Color of Powder | α-Fe₂O₃ % | Interference Color | Powder Color |
| 2.5 | 25 | 8.0 | red | ocher | 7.3 | pink red | ochre yellow |
| 5 | 50 | 14.9 | lilac | lilac red | 13.7 | light violet red | flesh colored |
| 7.5 | 75 | 20.8 | blue green | violet red | 19.2 | blue | reddish brown |
| 10 | 100 | 25.9 | yellow green | dark brown | 24.1 | blue green | brown |
| 12.5 | 125 | 30.4 | green gold | medium brown | 28.4 | yellow green | coffee brown |

EXAMPLE 7 a. Analogously to Example 3, 22.5 kg. of mica flakes coated with TiO₂ and ZrO₂ (consisting of 72% muscorepresents a review of the relationship of iron oxide quantity, interference color, and powder color.

TABLE VI

| Period of Addition hours | FeSO₄ Solution Consumed, in l. | Pigment Dried | | | Pigment Annealed | | |
|---|---|---|---|---|---|---|---|
| | | Fe₃O₄ % | Interference Color | Powder Color | α-Fe₂O₃ % | Interference Color | Powder Color |
| 1.25 | 12.5 | 4.8 | silver | light mouse grey | 4.9 | silver | beige |
| 2.5 | 25 | 9.1 | silver | medium mouse grey | 9.3 | silver | medium beige |
| 3.75 | 37.5 | 13.1 | silver | medium mouse grey | 13.5 | silver | dark beige |
| 5 | 50 | 16.7 | silver | dark mouse grey | 17.3 | silver | flesh colored |
| 7.5 | 75 | 23.1 | silver | grey black | 23.6 | silver | light brick red |

TABLE VI-continued

| Period of Addition hours | FeSO$_4$ Solution Consumed, in l. | Pigment Dried | | | Pigment Annealed | | |
|---|---|---|---|---|---|---|---|
| | | Fe$_3$O$_4$ % | Interference Color | Powder Color | α-Fe$_2$O$_3$ % | Interference Color | Powder Color |
| 12.5 | 125 | 33.4 | silver | black | 34.1 | silver | brick red |

EXAMPLE 8 a. 15 kg. of muscovite having a diameter of about 10–40 μ and an average thickness of about 0.5 μ (specific surface area about 3.5 m$^2$/g.) is suspended in 600 l. of fully desalted water. The suspension is heated under agitation to 65° and a pH of 5.7 is set by the addition of H$_2$SO$_4$. Then, 175 l. of a solution of 90 kg. FeSO$_4$ · 7 H$_2$O and 900 ml. of sulfuric acid in 300 ml. of water is gradually added in metered amounts; simultaneously, air is introduced under stirring. The pH is maintained constant at 5.7 by NH$_3$. Also the temperature is maintained at the same value. After the coating step, the substance shows an orange red interference color and contains, in addition to 47.3% mica, 52.7% α-FeOOH. The suspension is agitated for ½ hour at 65°. Thereafter, the pH is raised to 8.0 by adding NH$_3$, and a solution of 4.74 kg. of AlCl$_3$ · 6 H$_2$O in 50 l. of water is gradually introduced, the pH being kept constant at 8.0 by feeding NH$_3$. The temperature is set to 65°.

The thus-precipitated aluminum hydroxide is quantitatively deposited on the pigment, but the appearance of the substance is altered only insubstantially. Then, the mixture is stirred for about 1 hour at 65° and thereupon the pigment is allowed to settle. The product is filtered off, washed with water, and dried for 1 hour at 130°. The color of the powder is red and the interference color orange red, and the substance contains 45.8% mica, 51.1% α-FeOOH, and 3.1% aluminum hydroxide (as Al$_2$O$_3$).

b. The pigment obtained according to Example 8a is annealed at 850° for 40 minutes, thus obtaining a pigment which, with a violet red powder color, has a red interference color and contains, in addition to 48.2% mica, 48.6% Fe$_2$O$_3$ and 3.2% Al$_2$O$_3$.

EXAMPLE 9

15 g. of mica flakes coated with TiO$_2$ (consisting of 72% muscovite having a particle size of 10–40 μ and 28% TiO$_2$, silver nacreous luster) is suspended in 600 ml. of fully desalted water. The suspension is heated under agitation to 85° and 20 g. of urea is added. Thereafter, a solution of 4.4 g. of FeCl$_3$ · 6H$_2$O in 300 ml. of water is gradually added thereto in metered quantities. The thus-precipitated β-FeOOH is deposited on the mica flakes in the form of a smooth coating. The final product has an orange-yellow powder color with a silver nacreous luster.

USE OF THE PIGMENTS

1. Eye Shadow Stick with Colorful Nacreous Luster

| | | |
|---|---|---|
| Pigment according to Example 1(b) (56.4% Fe$_2$O$_3$) | 10 | % |
| Castor oil | 15 | % |
| Perfume | 0.5 | % |
| Wax/oil base composition | 74.5 | % |
| Components contained in the wax/oil base composition: | | |
| Beeswax | 12.5 | % |
| Carnauba wax | 6.2 | % |
| Hard paraffin | 6.2 | % |
| Cetyl alcohol | 3.7 | % |
| Vaseline, white | 2.5 | % |
| Lanolin | 2.5 | % |
| Paraffin | 1.2 | % |
| Isopropyl myristate | 10.0 | % |
| Castor oil | 55.05 | % |
| Propyl p-hydroxybenzoate | 0.1 | % |
| Antioxidant | 0.05 | % |

2. Eye Shadow Powder Compact with Colorful Nacreous Luster

| | | |
|---|---|---|
| Pigment according to Example 1(b) (36.5 % Fe$_2$O$_3$) | 50 | % |
| Talc | 29.5 | % |
| Kaolin | 3 | % |
| Calcium stearate | 5 | % |
| Corn starch | 3 | % |
| Isopropyl lanolate | 6 | % |
| Isopropyl myristate | 3 | % |
| Perfume | 0.5 | % |

3. Eye Shadow and Eyeliner, Liquid

| | | |
|---|---|---|
| Pigment according to Example 6(b) (24.1 % Fe$_2$O$_3$) | 12 | % |
| 1,2-Propylene glycol | 20 | % |
| Magnesium aluminum silicate | 2.5 | % |
| Water | 65.5 | % |

4. Lipstick with Colorful Nacreous Luster

| | | |
|---|---|---|
| Pigment according to Example 1(b) (36.5 % Fe$_2$O$_3$) | 15 | % |
| Castor oil | 14 | % |
| Perfume | 0.5 | % |
| Wax/oil base composition | 70.5 | % |
| Components contained in the wax/oil base composition: | | |
| Beeswax | 13.7 | % |
| Carnauba wax | 7.5 | % |
| Hard paraffin | 7.5 | % |
| Cetyl alcohol | 2.5 | % |
| Candelilla wax | 3.7 | % |
| Lanolin | 2.5 | % |
| Paraffin | 1.2 | % |
| Isopropyl myristate | 6.2 | % |
| Castor oil | 55.05 | % |
| Propyl p-hydroxybenzoate | 0.1 | % |
| Antioxidant | 0.05 | % |

5. Lip Gloss Cream, Fluid, for Lipbrush

| | | |
|---|---|---|
| Pigment according to Example 4(b) (23.6 % Fe$_2$O$_3$) | 12.5 | % |
| Perfume | 0.5 | % |
| Oil/wax base composition | 87 | % |
| Components contained in the oil/wax base composition: | | |
| Castor oil | 82 | % |
| Lanolin | 15 | % |
| Cetyl alcohol | 3 | % |

6. Makeup, in Stick Form

| | | |
|---|---|---|
| Pigment according to Example 7(b) (9.3% Fe$_2$O$_3$) | 20 | % |
| Castor oil | 6 | % |
| Perfume | 1 | % |
| Oil/soap/wax base composition | 73 | % |
| Components contained in the base composition: | | |
| Beeswax | 21.5 | % |
| Carnauba wax | 6 | % |
| Vaseline, white | 6 | % |
| Castor oil | 43.85 | % |
| Propyl p-hydroxybenzoate | 0.1 | % |
| Antioxidant | 0.05 | % |
| Calcium stearate/paraffin, viscous | (1+2)16.5 | % |
| Talc | 6.0 | % |

7. Makeup Powder Compact

| | | |
|---|---|---|
| Pigment according to Example 4(a) (18.6 % α-FeOOH) | 30 | % |
| Talc | 52.5 | % |
| Kaolin | 3 | % |
| Calcium stearate | 5 | % |
| Corn starch | 3 | % |
| Isopropyl lanolate | 5 | % |
| Isopropyl myristate | 1 | % |
| Perfume | 0.5 | % |

8. Makeup Emulsion

USE OF THE PIGMENTS-continued

| | | |
|---|---|---|
| Pigment according to Example 4(b) (23.6 % $Fe_2O_3$) | 10 | % |
| Lanolin | 4 | % |
| Vaseline, white | 4 | % |
| Isopropyl myristate | 7 | % |
| Titanium dioxide | 6 | % |
| Sorbitan monostearate | 5 | % |
| Polyoxyethylene monostearate } as emulsifiers | 5 | % |
| 1,2-Propanediol | 4 | % |
| Methyl 4-hydroxybenzoate | 0.2 | % |
| Magnesium silicate, high-purity | 1 | % |
| Water, desalted | 53.5 | % |
| Perfume | 0.3 | % |

9. Makeup Moisturizing Gel

| | | |
|---|---|---|
| Pigment according to Example 2(b) | 2 | % |
| Vaseline, white | 58 | % |
| Paraffin, liquid | 20 | % |
| Triglyceride of saturated vegetable fatty acids $C_8$–$C_{12}$ | 15 | % |
| Isopropyl myristate | 5 | % |
| Perfume | | |

10. Light-Protective Emulsion with Makeup Color Luster

| | | |
|---|---|---|
| Pigment according to Example 1(b) (56.4 % $Fe_2O_3$) | 7 | % |
| Paraffin, liquid | 9 | % |
| $C_8$–$C_{12}$ Fatty acid triglyceride | 5 | % |
| Isopropyl myristate | 3 | % |
| Cetyl alcohol | 2.5 | % |
| Sorbitan monostearate | 1.8 | % |
| Polyoxyethylene sorbitan monostearate } as emulsifiers | 2.7 | % |
| Titanium dioxide | 6 | % |
| 2-Phenylbenzimidazole-5-sulfonic acid | 2 | % |
| Triethanolamine | 1 | % |
| Sorbitol, liquid | 3 | % |
| Magnesium silicate, high-purity | 0.5 | % |
| Methyl 4-hydroxybenzoate | 0.2 | % |
| Water, desalted | 56.3 | % |
| Perfume | | |

11. Tanning Emulsion with Makeup Color Luster

| | | |
|---|---|---|
| Pigment according to Example 5(b) (26.5 % $\gamma$-$Fe_2O_3$) | 7 | % |
| Paraffin, liquid | 17 | % |
| Isopropyl myristate | 5 | % |
| Hard paraffin | 1 | % |
| Beeswax | 1.0 | % |
| Sorbitan sesquioleate | 3.0 | % |
| Polyoxyethylene sorbitan trioleate } as emulsifiers | 3.0 | % |
| Sorbitol solution, 70% | 3.0 | % |
| 1,2-Propanediol | 2.0 | % |
| Magnesium sulfate-7-hydrate | 0.6 | % |
| Dihydroxyacetone | 4.0 | % |
| Phosphate buffer | 1.0 | % |
| Methyl 4-hydroxybenzoate | 0.2 | % |
| Water, desalted | 52.2 | % |

12. Bubble Bath Concentrate with Nacreous Luster

| | | |
|---|---|---|
| Pigment according to Example 1(b) (50.2% $\alpha$-$Fe_2O_3$) | 0.2 | % |
| Finely disperse silicic acid made into a slurry with water, 1+9 | 10.0 | % |
| Water, fully desalted | 8.3 | % |
| Citric acid | 1.0 | % |
| Perfume, water-soluble | 1.5 | % |
| Sodium lauryl ether sulfate | 15.0 | % |
| Ammonium fatty alcohol ether sulfate | 60.0 | % |
| Coconut fatty acid diethanolamide | 4.0 | % |

13. Skin Care Lotion with Colorful Nacreous Luster

| | | |
|---|---|---|
| Pigment according to Example 5(c) (26.5 % $Fe_2O_3$) | 0.1 | % |
| Carboxyvinyl polymer | 0.2 | % |
| Water, deionized | 70.4 | % |
| Diisopropanolamine | 0.2 | % |
| Allantoin | 0.1 | % |
| Vitamins A, $D_3$, E, water-soluble | 1.0 | % |
| 1,2-Propylene glycol | 3.0 | % |
| Ethanol, 95% by weight | 25.0 | % |
| Perfume, water-soluble | | |

14. Panel-Shaped Blank for Buttons

A pigment according to Example 1b is suspended in twice the quantity of a mixture of equal parts of n-butyl acetate, ethylene glycol monoethyl ether, and dibutyl phthalate. Of the thus-obtained suspension, 2.5 g. is mixed with 250 g. of an unsaturated polyester resin, and the batch is cured in a centrifugal drum after adding 1 ml. of a 1% solution of cobalt octoate and 6 ml. of a 50% ketone peroxide. After curing, a polyester plate is obtained having a uniform nacreous luster character with a brown-red luster from which buttons can be produced, for example.

15. Pigmenting of Thermoplastics 10 kg. of polystyrene is mixed with 50 g. of dibutyl phthalate and intermixed intensively for 15 minutes. After adding 100 g. of the pigment obtained according to Example 1b with 50.2% $Fe_2O_3$, the mixture is vigorously shaken for another half hour. The thus-obtained mixture is then molded in a screw-type injection molding machine at about 200° to stepped small plates which have a very good nacreous luster and an attractive violet color.

16. Pigmented Varnishes 30 parts of collodion cotton (22% strength in butyl acetate)
40 parts of oil-extended alkyd resin on the basis of synthetic fatty acids (75% strength in mineral spirits)
10 parts of toluene
4 parts of butyl glycolate
2 parts of cobalt drier are combined and stirred. Two parts of a pigment produced according to Example 1b is moistened with 4 parts of butyl acetate and introduced into the charge. After thorough intermixing, the varnish is sprayed onto primed sheet-metal plates. During drying, a smooth film having a very high nacreous luster is produced.

The preceding examples can be repeated with similar success by substituting the generically and specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A mica flake pigment of improved lightfastness consisting essentially of translucent mica flakes coated with a coating comprising up to 90% of the weight of the pigment of a continuous uniform layer of up to 500 nm thickness consisting of one only of $\alpha$-, $\beta$- or $\gamma$-FeOOH or magnetite.

2. A pigment according to claim 1 wherein the uniform layer is $\alpha$- or $\gamma$-FeOOH.

3. A pigment according to claim 1 wherein the uniform layer is $\alpha$-FeOOH.

4. A pigment according to claim 1 wherein the uniform layer is $\beta$-FeOOH.

5. A pigment according to claim 1 wherein the uniform layer is magnetite.

6. A pigment according to claim 1 wherein the uniform layer has a thickness of 0.1–250 nm.

7. A pigment according to claim 1 having a cover layer of colorless metallic oxide over the uniform layer.

8. A pigment according to claim 1 wherein the mica flakes have a coating of one or more of $TiO_2$, $ZrO_2$, or a hydrate thereof beneath the uniform layer.

9. A pigment according to claim 1 wherein the mica flakes have a coating of one or more of $TiO_2$, $ZrO_2$, or a hydrate thereof beneath the uniform layer.

10. A process for the production of coated mica flake pigments of claim 1, which comprises gradually adding, in the presence of an oxidizing agent, an aqueous solution of an iron salt to an aqueous suspension of uncoated mica flakes or mica flakes coated with one or both of $TiO_2$ and $ZrO_2$ or a hydrate thereof, at a constant temperature and a constant pH and at a rate not exceeding that at which the precipitated iron oxide hydroxide or magnetite is deposited on the mica flakes, whereby a continuous uniform layer consisting of one only of $\alpha$- or $\gamma$-FeOOH or magnetite is precipitated onto the mica flakes.

11. A process for the production of coated mica flake pigments of claim 1, which comprises gradually adding an aqueous solution of an iron(III) salt to an aqueous suspension containing urea or acetamide of uncoated mica flakes or mica flakes coated with one or both of $TiO_2$ and $ZrO_2$ or a hydrate thereof, at a constant temperature and a constant pH and at a rate not exceeding that at which the precipitated iron oxide hydroxide is deposited on the mica flakes, whereby a continuous uniform layer consisting of $\beta$-FeOOH is precipitated onto the mica flakes.

12. A process according to claim 10 wherein the iron salt is an iron(II) salt.

13. A process according to claim 12 wherein the iron(II) salt is $FeSO_4$.

14. A process according to claim 12 wherein the oxidizing agent is gaseous oxygen.

15. A process according to claim 14 wherein the oxygen is supplied as air.

16. A process according to claim 11 wherein the iron(III) salt is $FeCl_3$.

17. A process according to claim 10 wherein the precipitation is conducted at a constant temperature of between 25° and 100° and a constant pH of between 4 and 8, and a unitary layer of $\alpha$-FeOOH is precipitated.

18. A process according to claim 17 wherein the iron salt is an iron(II) salt.

19. A process according to claim 18 wherein the oxidizing agent is air and the iron(II) salt is ferrous sulfate.

20. A process according to claim 10 wherein the precipitation is conducted at a constant temperature of between 0° and 50° and a constant pH of between 6 and 9, and a unitary layer of $\gamma$-FeOOH is precipitated.

21. A process according to claim 20 wherein the iron salt is an iron(II) salt.

22. A process according to claim 21 wherein the oxidizing agent is air and the iron(II) salt is ferrous sulfate.

23. A process according to claim 10 wherein the precipitation is conducted at a constant temperature of between 50° and 100° and a constant pH of greater than 7, and a unitary layer of magnetite is precipitated.

24. A process according to claim 23 wherein the pH is between 8 and 11.

25. A process according to claim 10 wherein the thusobtained pigment is annealed at a temperature of between 600° and 1,000°.

26. A process according to claim 17 wherein the thusobtained pigment is annealed at a temperature of between 600° and 1,000°.

27. A process according to claim 20 wherein the thusobtained pigment is annealed at a temperature of between 600° and 1,000°.

28. A process according to claim 23 wherein the thusobtained pigment is annealed at a temperature of between 600° and 1,000°.

29. A mica flake pigment of improved light fastness consisting essentially of translucent mica flakes coated with a coating comprising up to 90% of the weight of the pigment of a continuous uniform layer of up to 500 nm thickness consisting of $\alpha$-$Fe_2O_3$ and produced by annealing at a temperature between about 400° and 1,100° C. an otherwise corresponding mica flake pigment whose continuous uniform layer consists of one only of $\alpha$-, $\beta$- $\gamma$-FeOOH or magnetite.

30. A mica flake pigment according to claim 29 having an $Fe_2O_3$ content of 22.4–59.1%, calculated on the total weight of the pigment.

31. A mica flake pigment of improved light fastness consisting essentially of translucent mica flakes coated with a coating comprising up to 90% of the weight of the pigment of a continuous uniform layer of up to 500 nm thickness consisting of $\gamma$-$Fe_2O_3$ and produced by dehydrating at a temperature of up to 400°C. a corresponding mica flake pigment whose continuous uniform layer consists of one only of $\beta$- or $\gamma$-FeOOH.

* * * * *

UNITED STATES PATENT AND TRADEMARK OFFICE
CERTIFICATE OF CORRECTION

PATENT NO. : 3,926,659
DATED : December 16, 1975
INVENTOR(S) : BERNHARD ET AL.

It is certified that error appears in the above–identified patent and that said Letters Patent are hereby corrected as shown below:

Column 21, line 1: change "claim 1" to read -- claim 29 --.

Signed and Sealed this

Twenty-second Day of March 1977

[SEAL]

Attest:

RUTH C. MASON
*Attesting Officer*

C. MARSHALL DANN
*Commissioner of Patents and Trademarks*